(12) United States Patent  
Andresky

(10) Patent No.: US 7,439,860 B2
(45) Date of Patent: Oct. 21, 2008

(54) AUTO-TUNED RFID READER ANTENNA

(75) Inventor: David Andresky, Lafayette, CO (US)

(73) Assignee: Assa Abloy AB (SE)

( * ) Notice: Subject to any disclaimer, the term of this patent is extended or adjusted under 35 U.S.C. 154(b) by 158 days.

(21) Appl. No.: 11/387,755

(22) Filed: Mar. 22, 2006

(65) Prior Publication Data

US 2007/0222605 A1   Sep. 27, 2007

(51) Int. Cl.
*G08B 13/14* (2006.01)
(52) U.S. Cl. .................. 340/572.1; 340/572.5
(58) Field of Classification Search ........... 340/572.1, 340/572.5, 572.7, 10.5, 10.51
See application file for complete search history.

(56) References Cited

U.S. PATENT DOCUMENTS

| | | | |
|---|---|---|---|
| 5,936,527 A | 8/1999 | Isaacman et al. | |
| 6,307,468 B1 * | 10/2001 | Ward, Jr. | 340/572.1 |
| 6,307,517 B1 * | 10/2001 | Lee | 340/572.1 |
| 6,650,227 B1 | 11/2003 | Bradin | |
| 6,943,680 B2 * | 9/2005 | Ward, Jr. | 340/572.1 |
| 6,963,729 B2 * | 11/2005 | Uozumi | 340/572.5 |
| 7,123,129 B1 * | 10/2006 | Schrott et al. | 340/572.5 |
| 7,202,790 B2 * | 4/2007 | Copeland et al. | 340/572.7 |
| 7,253,737 B2 * | 8/2007 | Cathey | 340/572.7 |
| 2002/0017993 A1 * | 2/2002 | Blama et al. | 340/572.1 |
| 2005/0285718 A1 * | 12/2005 | Enguent | 340/572.1 |
| 2007/0171065 A1 * | 7/2007 | Ku et al. | 340/572.1 |

* cited by examiner

*Primary Examiner*—John A Tweel, Jr.
(74) *Attorney, Agent, or Firm*—Sheridan Ross P.C.

(57) ABSTRACT

A reader for an RFID system includes an antenna assembly, a signal driver and a controller. The antenna assembly has an antenna coupled to an antenna tuning circuit which includes a variable capacitance circuit. The signal driver is coupled to the antenna assembly to apply a drive signal to the antenna assembly. The controller is coupled to the antenna assembly to determine a difference between an antenna impedance and a signal driver impedance and to set the variable capacitance at a set capacitance value which reduces the impedance difference.

22 Claims, 3 Drawing Sheets

AUTO-TUNED RFID READER ANTENNA

TECHNICAL FIELD

The present invention relates generally to readers for radio frequency identification systems, more particularly, to an auto-tuning circuit for use with an antenna of a reader.

BACKGROUND OF THE INVENTION

Radio frequency identification (RFID) systems typically include at least one reader and a plurality of transponders, which are commonly termed credentials, cards, tags, or the like. The transponder may be an active or passive radio frequency communication device which is directly attached to or embedded in an article to be identified or otherwise characterized by the reader. Alternatively, the transponder may be embedded in a portable substrate, such as a card or tag, carried by a person or an article to be identified or otherwise characterized by the reader. An active transponder is powered up by its own internal power supply, such as a battery, which provides the operating power for the transponder circuitry. In contrast, a passive transponder is characterized as being dependent on the reader for its power. The reader "excites" or powers up the passive transponder by transmitting excitation signals of a given frequency into the space surrounding the reader, which are received by the transponder and provide the operating power for the circuitry of the recipient transponder.

Communication between the reader and transponder is enabled by cooperative resonant circuits which are provided in each reader and transponder. The resonant circuit of a reader includes an inductor, typically in the form of an antenna, which magnetically couples to the inductor in the resonant circuit of a compatible transponder through mutual inductance. The resonant circuit of the transponder correspondingly includes an inductor which magnetically couples to the inductor in the resonant circuit of the reader through mutual inductance.

Communication is initiated when a transponder is proximally positioned relative to the reader. The reader has a power supply which conveys a current to the reader resonant circuit causing the reader antenna to produce an excitation signal in the form of an electromagnetic field. The excitation signal couples to the antenna of the proximally-positioned transponder through mutual inductance and the excitation signal powers and clocks the transponder circuitry initiating operation of the transponder.

Transponder operation comprises generation of a response signal at a specified frequency and transmission of the transponder response signal back to the reader. In particular, the transponder resonant circuit receives a current in response to the excitation signal which causes the transponder antenna to produce a response signal in the form of an electromagnetic field. The response signal couples to the reader antenna through mutual inductance in substantially the same manner as described above with respect to coupling of the excitation signal to the transponder antenna.

The transponder typically employs frequency or amplitude modulation of the response signal to encode data stored in the memory of the transponder circuitry into the response signal. When the response signal couples to the reader antenna, a corresponding current is induced in the reader antenna at the specified frequency. The reader processes the induced current to read the data encoded in the response signal. The resulting data may be communicated to an output device, such as a display, printer, or storage device, and simultaneously, or alternatively, communicated to a host computer, if a host computer is networked into the RFID system.

An important operating parameter of the reader is the range of the reader when communicating with a transponder. The range of the reader is inter alia strongly affected by the strength of the electromagnetic field generated by the reader resonant circuit. In order to generate a field strength which provides the reader with adequate range, the designer of the reader must properly specify a resonant circuit which is appropriately tuned to a predetermined frequency for the desired application of the RFID system.

Another important operating parameter of the reader is antenna impedance. It is desirable that the impedance of the antenna in the reader of an RFID system be specified to match the impedance of the antenna driver. However, the impedance of the reader antenna is often altered by the characteristics of the operating environment in which the reader resides. In a typical case where the reader is mounted in a fixed location on a support structure, the impedance of the reader antenna is susceptible to the materials of the mounting location and other objects within the operating environment. For example, if the mounting location of the reader is in an operating environment which includes nearby metal, the metal can alter the effective impedance of the resonant circuit, thereby detuning the resonant circuit from the predetermined frequency and dramatically reducing the range of the reader. Additionally, the impedance of the reader antenna can be disturbed during the antenna or reader fabrication process resulting in a detuned resonant circuit.

One means of overcoming the above-mentioned problems is to specifically tune each individual reader antenna for its intended operating environment. For example, the reader antenna may be individually tuned using component selection procedures during the reader fabrication process so that the impedance of the reader antenna matches the impedance of the antenna driver when installed in the intended operating environment. However, specific component selection during production is labor intensive and requires a high level of training and supervision, which are oftentimes cost prohibitive.

Alternatively, reader antennas may be tuned to a frequency between specified extremes to achieve consistent performance within a number of different operating environments. For example, the mounting location of the reader may reasonably be expected to consist of either drywall or a steel junction box. Rather than optimize the reader for one or the other of these two mounting locations, the antenna tuning is compromised so that antenna performance is consistent (although sub-optimal) in either operating environment. Although this alternative appears attractive, in practice the range of potential operating environments is typically so varied that it is not practical to optimize tuning for one environment over others. The full range of possible operating environments can have a drastic impact on antenna performance, especially when a reader is required to support multiple radio frequency (RF) protocols and transponder types. Compromising the antenna tuning between extremes results in reduced performance and can void the performance of some protocols and transponder types altogether.

The present invention recognizes a need for a reader of an RFID system which is adaptable to variations in its antenna performance caused by different operating environments and/or variations in values of the antenna fabrication parameters. Accordingly, it is generally an object of the present invention to provide an RFID system having a reader which exhibits satisfactory performance characteristics while adjusting to variations in a given system operating environment. More particularly, it is an object of the present invention to provide a reader achieving a uniformly satisfactory level of performance when the reader is employed in different operating environments. It is another object of the present invention to provide a reader which automatically retunes itself to maintain a desired performance level in response to variations in the operating environment of the reader. These objects and others are accomplished in accordance with the invention described hereafter.

SUMMARY OF THE INVENTION

The present invention is a reader for an RFID system. The reader comprises an antenna assembly, a signal driver and a controller. The antenna assembly includes an antenna tuning circuit and an antenna coupled to the antenna tuning circuit. The antenna has an antenna impedance and the signal driver has a signal driver impedance. The antenna tuning circuit includes a variable capacitance circuit having a variable capacitance. The signal driver is coupled to the antenna assembly to apply a drive signal to the antenna. The controller is coupled to the antenna assembly to determine a difference between the antenna impedance and the signal driver impedance and to set the variable capacitance to a set capacitance value which reduces the difference between the impedances.

In accordance with one embodiment, the reader further comprises a variable voltage source coupled between the controller and the variable capacitance circuit to apply a tuning bias signal to the variable capacitance circuit. The tuning bias signal has a biasing voltage value selected to reduce the difference between the impedances.

In accordance with another embodiment, the antenna tuning circuit further includes a fixed value capacitance circuit having one or more fixed value capacitors coupled in parallel to the antenna and/or a fixed value capacitance circuit having one or more fixed value capacitors coupled in series to the antenna. In accordance with yet another embodiment, the variable capacitance circuit comprises one or a plurality of parallely connected variable capacitance elements. The variable capacitance circuit alternately comprises a fixed value capacitor connected in series to one or a plurality of parallely connected variable capacitance elements.

The reader preferably further comprises a radio frequency transmissive housing at least partially enclosing the antenna assembly and a radio frequency reflective baseplate coupled to the housing to reduce susceptibility of the antenna to variations caused by objects in an operating environment of a reader. The housing is preferably fabricated from a plastic and the baseplate is preferably fabricated from a metal.

In an alternate characterization, the present invention is a method comprising conveying a drive signal from a signal driver to an antenna assembly. The antenna assembly includes an antenna tuning circuit coupled to an antenna. The antenna has an antenna impedance, the signal driver has a signal driver impedance, and the antenna tuning circuit has a variable capacitance. A difference between the antenna impedance and the signal driver impedance is determined and the variable capacitance is set at a set capacitance value to reduce the difference. In one embodiment, the method further comprises generating a tuning bias signal having a biasing voltage value. The tuning bias signal is applied to the antenna tuning circuit to set the variable capacitance at the set capacitance value.

In an another characterization, the present invention is a method comprising selecting a set capacitance value of an antenna tuning circuit having variable capacitance. The set capacitance value is selected by ranging an antenna operating parameter correlated to the variable capacitance through a progression of antenna operating parameter values. The set capacitance value of the antenna tuning circuit is set to reduce an imbalance between an impedance of an antenna coupled to the antenna tuning circuit and an impedance of a signal driver applying a drive signal to the antenna. The imbalance is preferably due to variations in an operating environment of the antenna or variations in values of an antenna fabrication parameter of the antenna.

In accordance with one embodiment, the method further comprises determining values of a circuit operating parameter of a circuit coupled to the antenna while ranging the values of the antenna operating parameter. The values of the antenna operating parameter are preferably correlated to the values of the circuit operating parameter.

In accordance with another embodiment, the method further comprises setting the antenna operating parameter to an antenna value correlated to the set capacitance value using a correlation between the antenna operating parameter values and the circuit operating parameter values.

A preferred antenna operating parameter is a biasing voltage of a tuning bias signal applied to the antenna tuning circuit. A preferred circuit operating parameter is a magnitude of a drive signal applied to the antenna, a phase across an inductor in the circuit, or a voltage magnitude on a terminal of an inductor in the circuit.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

Figure 1:
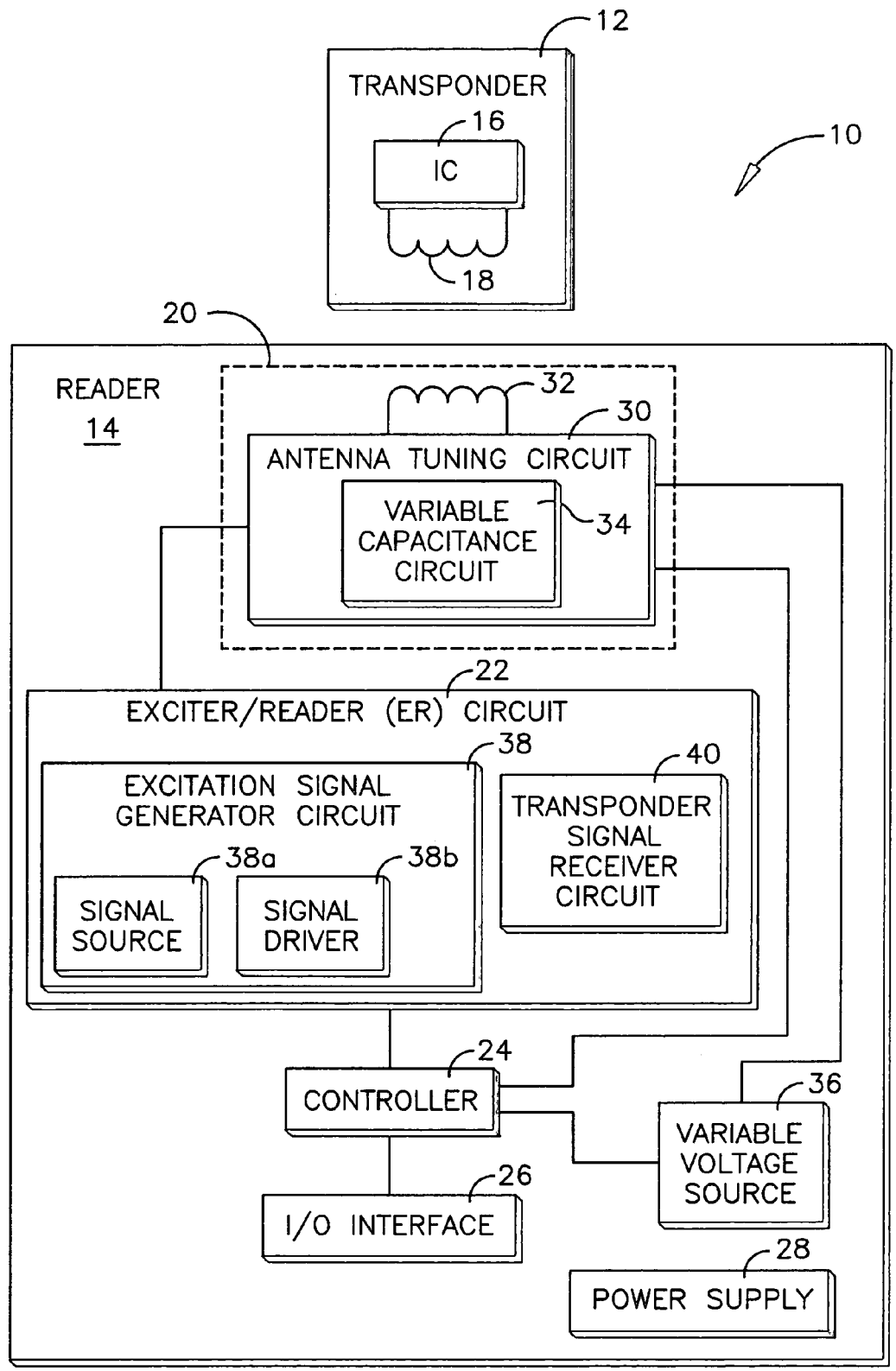
FIG. 1 is a block diagram of an RFID system including a transponder and a reader.

Embodiments of the invention are illustrated by way of example and not by way of limitation in the above-recited figures of the drawings in which like reference characters indicate the same or similar elements. It should be noted that common references to "an embodiment", "one embodiment", "an alternate embodiment", "a preferred embodiment", or the like herein are not necessarily references to the same embodiment.

DESCRIPTION OF PREFERRED EMBODIMENTS

An RFID system is shown in FIG. 1 and generally designated 10. The RFID system 10 comprises a transponder 12 and a reader 14. The transponder 12 is preferably a passive transponder which does not require an internal power supply. The electrical power required to operate the passive transponder 12 is supplied to the transponder 12 by electromagnetic energy transmitted from the reader 14, which is of a specific frequency and a sufficient strength to power up the transponder 12.

The transponder 12 comprises a number of functional elements including a transponder integrated circuit (IC) 16 and a transponder antenna 18. The transponder IC 16 embodies the processing and memory capabilities of the transponder 12. The transponder antenna 18 is coupled to the transponder IC 16 and is preferably a conventional coil termed a "dual-function antenna" which performs both the receiving and transmitting functions of the transponder 12. Alternatively, two separate receiving and transmitting antennas can be substituted for the single "dual function antenna" in the transponder 12. The transponder 12 also preferably includes a transponder capacitor (not shown) coupled to the transponder IC 16 and transponder antenna 18. The transponder antenna 18, in cooperation with the transponder capacitor, defines a transponder LC circuit having a tuned resonant frequency which corresponds to the carrier frequency of the transponder 12.

The transponder 12 shown and described herein is but an example of a type of transponder having utility in the RFID system 10. It is understood that practice of the present invention is not limited to any specific type of transponder, but is generally applicable to most conventional types of transponders having utility in RFID systems. Thus, for example, the transponder 12 can be selected from proximity cards, proximity tags, smart cards, or the like.

The reader 14 comprises a number of functional elements including a reader antenna assembly 20, an exciter/reader (ER) circuit 22, a controller 24, an input/output (I/O) interface 26, and a power supply 28. The power supply 28 provides electrical operating power to the reader components in a controlled manner. In accordance with one embodiment, the power supply 28 is coupled to a finite electrical power source which is self-contained (i.e., internal) within the reader 14, such as a relatively small portable battery consisting of one or more disposable or rechargeable wet or dry cells. Alternatively, the power supply 28 is hard wired to an essentially infinite remote electrical power source, such as an electric utility.

The reader antenna assembly 20 preferably includes an antenna tuning circuit 30 and a reader antenna 32. The reader antenna 32 is a "dual-function antenna" which performs both the receiving and transmitting functions of the reader 14. In particular, the reader antenna 32 receives transponder data signals from the external environment and transmits excitation signals into the external environment. Although not shown, the present invention alternately encompasses an antenna assembly having two separate receiving and transmitting antennas, respectively, which separately perform the receiving and transmitting functions of the reader 14.

The antenna tuning circuit 30 includes a variable capacitance circuit 34 coupled to the reader antenna 32. The variable capacitance circuit 34 and reader antenna 32 in combination define a reader LC circuit. The reader 14 further comprises a variable voltage source 36 coupled between the antenna tunning circuit 30 and the controller 24. The variable voltage source 36 functions to generate a plurality of tuning bias signals in a manner described below. The variable voltage source 36 preferably comprises a digital potentiometer or any other suitable variable voltage device, such as a microprocessor reference voltage module, a digital to analog converter or a variable voltage regulator.

The ER circuit 22 comprises an excitation signal generator circuit 38 and a transponder signal receiver circuit 40. The excitation signal generator circuit 38 includes a signal source 38a and a signal driver 38b. The excitation signal generator circuit 38 generally functions to generate an excitation signal which the reader antenna assembly 20 transmits in the form of electromagnetic waves into the open space of the operating environment surrounding the reader 14. In particular, the reader 14 draws electric power from the power source 28 to the signal source 38a when the transponder 12 is proximally positioned relative to the reader 14. The signal source 38a produces a signal, which is amplified by the signal driver 38b to supply an AC drive signal having a high voltage and high current to the reader antenna assembly 20. The reader antenna assembly 20 resonates at its resonant frequency in response to the high voltage/high current AC drive signal, thereby generating excitation signals which are transmitted by the reader antenna assembly 20.

The excitation signals are received by a transponder 12 in the proximal space of the reader 14 (i.e., within a read range of the reader) to power up the transponder 12. Upon activation, the transponder IC 16 generates a transponder data signal, which contains readable information, i.e., transponder data, copied or otherwise derived from the memory of the transponder IC 16. The transponder data signal is transmitted into the open space of the external environment surrounding the transponder 12 via the transponder antenna 18. When a transponder data signal is received at the reader antenna assembly 20, the transponder signal receiver circuit 40 performs various operations on the transponder data signal to condition the signal, thereby producing a conditioned signal which is suitable for reading by the reader 14.

The conditioned signal containing the data from the transponder data signal is conveyed to the controller 24, which processes the conditioned signal to extract the readable transponder data contained therein. In particular, the controller 24 demodulates the conditioned signal in accordance with a respective modulation type according to firmware and/or software executed by the controller 24. The extracted transponder data may be sent to an external device such as a central host computer (not shown) via the I/O interface 26.

As noted above, the excitation signal generator circuit 38 and the transponder signal receiver circuit 40 in combination are termed the ER circuit 22. Skilled artisans can appreciate that the reader 14 can be adapted in accordance with the present invention to include a writer circuit (not shown) which is capable of writing programming instructions or other information to a transponder by either contact or contactless means. The ER circuit and writer circuit in combination are termed an exciter/reader/writer (ERW) circuit.

Figure 2:
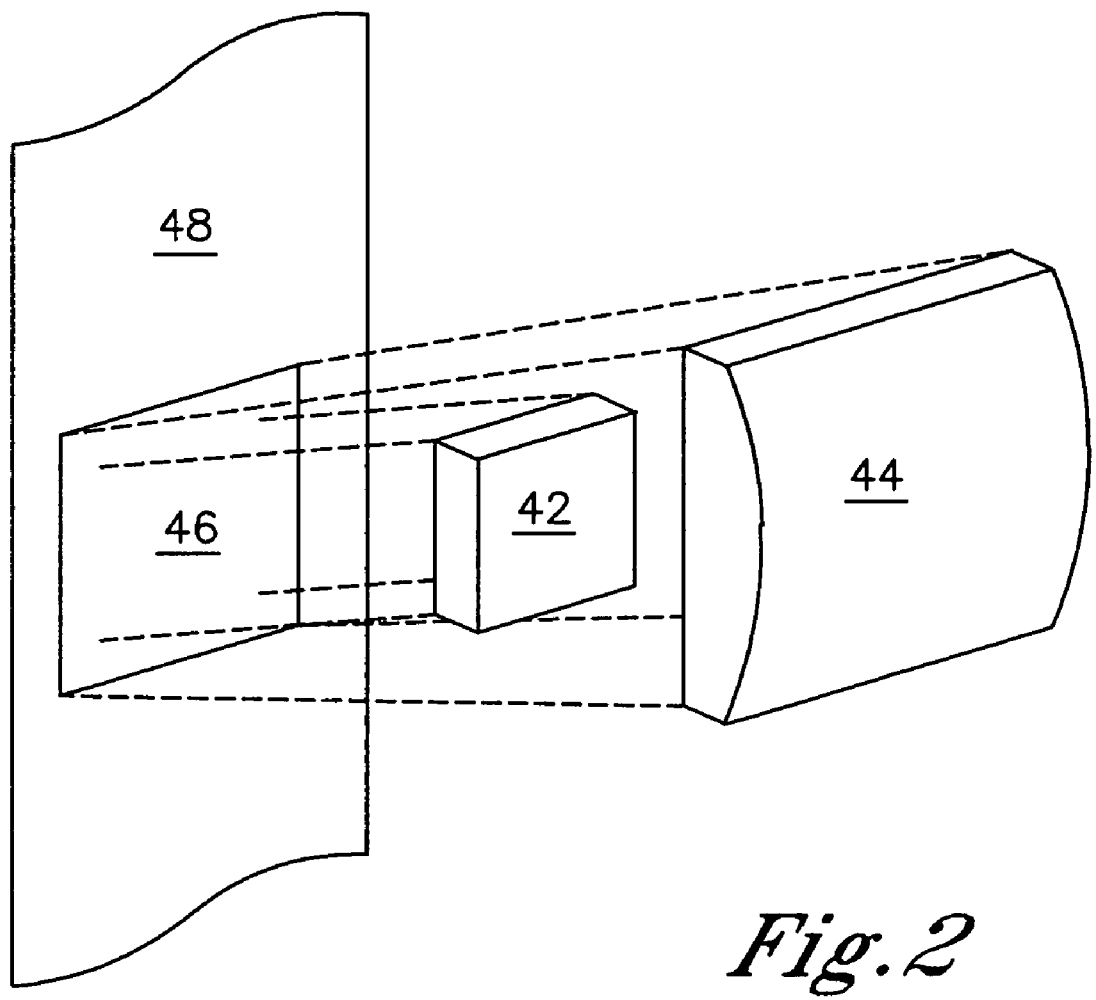
FIG. 2 is an exploded perspective view of the reader of FIG. 1 having internal circuitry enclosed within a reader housing and baseplate.

Referring to FIG. 2, the above-described internal circuitry 42 of the reader 14 is preferably enclosed by a reader housing 44 and a baseplate 46 which is coupled to the housing 44. The housing 44 defines the front face and sides of the reader 14 while the baseplate 46 defines the back face of the reader 14. When the reader 14 is affixed to a support structure 48 at a mounting location, the baseplate 46 is preferably positioned between the support structure 48 and the internal circuitry 42 of the reader 14. The support structure 48 typically includes any one or more of the following materials: drywall, brick, wood, metal junction boxes, metal mullions, or the like. The internal circuitry 42 of the reader 14 is preferably attached to the inside face of the baseplate 46. The outside face of the baseplate 46 preferably fixably engages the support structure 48 by means of an adhesive and/or screws or other fasteners which securely mount the reader 14 to the support structure 48. When the reader 14 is mounted to the support structure 48, the baseplate 46 is generally substantially concealed from view while the reader housing 44 is fully exposed.

The housing 44 is preferably fabricated from a material which is relatively transparent to RF signals (i.e., relatively RF transmissive) such as a rigid high-strength plastic. The housing 44 may be provided with a window (not shown) which is open or formed from a more RF transparent material than the remainder of the housing 44 to further enhance the RF transparency of the housing 44. The baseplate 46 is preferably formed from a rigid metallic material which is relatively reflective of RF signals. An exemplary preferred metal is sheet aluminum. As such, the baseplate 46 functions to reduce the susceptibility of the reader 14 to variations in the reader mounting location and, more generally, to variations in the reader operating environment. Antenna fabrication variances as well as remaining effects of the operating environment not compensated for by the baseplate 46 are managed by the variable capacitance circuit 34 (shown in FIG. 1) in a manner described below. An ancillary function of the baseplate 44 is to provide the reader 14 with mechanical rigidity while resisting tampering.

Figure 3:
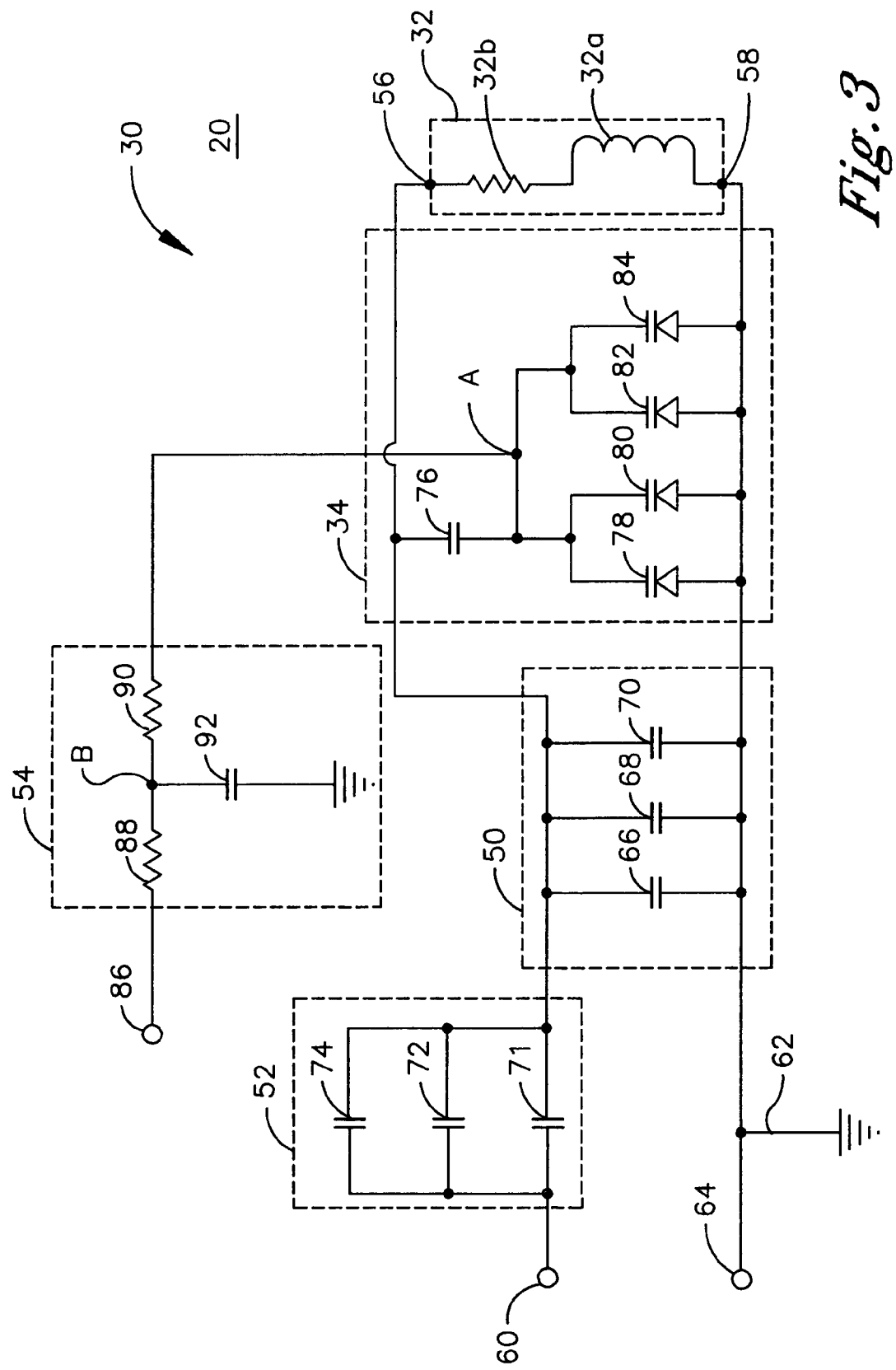
FIG. 3 is a schematic view of an antenna turning circuit of the reader antenna assembly of FIG. 1.

Referring to FIG. 3, an embodiment of the reader antenna assembly included within the reader 14 of FIG. 1 is shown and generally designated 20. As noted above, the reader antenna assembly 20 includes the antenna tuning circuit 30 and reader antenna 32. The antenna tuning circuit 30 generally comprises the variable capacitance circuit 34, a first fixed value capacitance circuit 50, and a second fixed value capacitance circuit 52. The first and second fixed value capacitance circuits 50, 52 are coupled in series to the variable capacitance circuit 34 and the variable capacitance circuit 34 is coupled to a bias voltage receiving circuit 54.

The reader antenna 32 is an inductor 32a and a resistor 32b in combination. The reader antenna 32 further includes first and second antenna terminals 56, 58. The first antenna terminal 56 is an antenna input/output terminal and is connected to a drive signal input terminal 60 via the variable capacitance circuit 34 and first and second fixed value capacitance circuits 50, 52. The drive signal input terminal 60 is further connected to the controller 24 and the excitation signal generator and transponder signal receiver circuits 38, 40 of the ER circuit 22 shown in FIG. 1. The second antenna terminal 58 is an antenna ground terminal connected to a system common ground 62 which is connected to a system ground terminal 64.

In accordance with the present exemplary embodiment, the first fixed value capacitance circuit 50 includes fixed value capacitors 66, 68, 70 coupled in parallel to the antenna 32 between the first and second antenna terminals 56, 58. The second fixed value capacitance circuit 52 includes fixed value capacitors 71, 72, 74 coupled in series to the antenna 32. As such, the drive signal input terminal 60, second fixed value capacitance circuit 52, first fixed value capacitance circuit 50, and variable value capacitance circuit 34 define a drive signal pathway between the signal driver 38b and the antenna 32.

In accordance with alternate embodiments not shown, the first fixed value capacitance circuit 50 has any number of one or more fixed value capacitors coupled in parallel to the antenna 32 to achieve a desired fixed value parallel capacitance, while the second fixed value capacitance circuit 52 has any number of one or more fixed value capacitors connected in series to the antenna 32 to achieve a desired fixed value series capacitance. In accordance with yet another alternate embodiment not shown, the first fixed value capacitance circuit 50 is omitted in its entirety from the antenna tuning circuit 30, while the second fixed value capacitance circuit 52 is retained having at least one fixed value capacitor coupled in series to the antenna 32 via the variable capacitance circuit 34.

The variable capacitance circuit 34 includes at least one variable capacitance circuit element coupled to the reader antenna 32. In accordance with the present embodiment, the variable capacitance circuit 34 includes a fixed value capacitor 76 connected in series to a plurality of variable capacitance elements 78, 80, 82, 84 which are preferably varactors, alternately termed variable capacitance diodes. The variable capacitance circuit 34 is connected in parallel to the reader antenna 32 between the first and second antenna terminals 56, 58.

The bias voltage receiving circuit 54 is coupled in series between the variable voltage source 36 and the variable capacitance circuit 34. The variable voltage source 36 is coupled to the bias voltage receiving circuit 54 via a bias signal input terminal 86. As such, the bias signal input terminal 86 and bias voltage receiving circuit 54 define a tuning bias signal pathway from the variable voltage source 36 to the variable capacitance circuit 34. Each tuning bias signal is preferably a DC voltage signal which applies a reverse bias within a range of biasing voltages to the variable capacitance circuit 34. The bias voltage receiving circuit 54 of the present embodiment includes resistors 88, 90 which are serially connected between the bias signal input terminal 86 and a junction A. The junction A is formed between the fixed value capacitor 76 and the parallely connected variable capacitance elements 78, 80, 82, 84. The bias voltage receiving circuit 54 optionally includes a capacitor 92 coupled between a junction B and ground.

The fixed value capacitor 76 combines with the variable capacitance elements 78, 80, 82, 84 to provide an overall capacitance that can be added to the parallel fixed value capacitors 66, 68, 70 and series fixed value capacitors 71, 72, 74. The capacitance values of the first fixed value capacitance circuit 50 and the second fixed value capacitance circuit 52 are selected upon fabrication of the reader antenna assembly 20 in accordance with a number of alternate embodiments. In one embodiment, the capacitance values of the first fixed value capacitance circuit 50 and second fixed value capacitance circuit 52 are selected such that the impedance of the reader antenna 32 matches the impedance of the circuit driving the antenna 32 (i.e., the signal driver 38b) when a DC tuning bias signal having a middle voltage is applied to the variable capacitance circuit 34. An exemplary middle value of the DC tuning bias signal is 2.5 volts, which is defined by a range of biasing voltage values (e.g., a range between 0 and 5 volts). An alternate middle value of the DC tuning bias signal is 4 volts, which is defined by an exemplary range of voltage values between 0 and 8 volts.

In another embodiment, the capacitance values of the first fixed value capacitance circuit 50 and second fixed value capacitance circuit 52 are selected such that the reader antenna 32 is tuned to about 4 volts when the variable capacitance circuit 34 has a nominal capacitance value and no metal is within the operating environment of the reader 14. When metal is introduced into the operating environment, it is preferable to increase the capacitance of the variable capacitance circuit 34 by decreasing the voltage of the tuning biasing signal applied to the circuit 34, thereby maintaining the tuned voltage of the reader antenna 32 constant. The available range of tuning bias signals generated by the variable voltage source 36 and, correspondingly, the available capacitance range of the variable capacitance circuit 34 is determined by the fabrication particulars of the reader antenna 32 and/or the particulars of the reader operating environment. As noted above exemplary voltage value ranges for the tuning bias signals are 0 to 5 volts and 0 to 8 volts. However, substantially any range of voltage values for the tuning bias signals within the practical limits of the variable capacitance circuit 34 may have utility within the scope of the present invention.

The capacitance value of the fixed value capacitor 76 is preferably selected to prevent substantial forward biasing (i.e., to maintain reverse biasing) of the variable capacitance elements 78, 80, 82, 84. When an AC drive signal is applied to the first antenna terminal 56, the AC drive signal swings equally on either side of the second antenna terminal 58 creating the potential of forward biasing the variable capacitance elements 78, 80, 82, 84, particularly if the capacitance of the fixed value capacitor 76 is too large and the AC drive signal swings too far below ground. Forward biasing can cause the variable capacitance circuit 34 to discharge its DC biasing voltage and undesirably alters the capacitance of the variable capacitance circuit 34.

Selecting a fixed value capacitor 76 having a reduced capacitance value effectively creates a voltage divider which reduces the magnitude of the AC drive signal that is input to the cathode (the junction A) of the variable capacitance elements 78, 80, 82, 84. Therefore, it is generally desirable to select a fixed value capacitor 76 having a capacitance value which sufficiently decreases the magnitude of the AC drive signal at the junction A to prevent the AC drive signal from swinging so far below ground that it significantly forward biases the variable capacitance elements 78, 80, 82, 84. It is noted that a relatively small degree of forward bias can typically be tolerated before affecting capacitance (e.g., approximately 500 mV). Thus, it is preferable not to exceed the forward bias tolerances of the variable capacitance elements 78, 80, 82, 84.

Appropriate selection of the fixed value capacitor 76 maintains the variable capacitance elements 78, 80, 82, 84 biased at a desired level and ensures a constant capacitance. However, selecting a fixed value capacitor 76 having too low a capacitance value can severely limit the capacitive range of the variable capacitance circuit 34. Therefore, the capacitance value of the fixed value capacitor 76 is selected in correspondence with the desired capacitance range of the variable capacitance elements 78, 80, 82, 84 to achieve a desired range of tuning capacitance seen by the reader antenna 32, while maintaining the variable capacitance elements 78, 80, 82, 84 reverse biased.

A method for automatically tuning the antenna assembly 20 in response to variations in the operating environment of the reader 14 and/or variations in values of the antenna fabrication parameters (e.g., variations in antenna design tolerances) is described hereafter with reference to FIGS. 1 and 3. The method is performed in either a continuous or an intermittent mode and utilizes the controller 24, antenna tuning circuit 30 and variable voltage source 36. In general terms, the controller 24 automatically performs the tuning method by adjusting the capacitance of the antenna tuning circuit 30 to a preferred capacitance value, which effectively compensates for imbalances between the impedances of the reader antenna 32 and signal driver 38b due to variations in the operating environment of the reader 14 and/or variations in values of the antenna fabrication parameters.

The controller 24 selects the preferred capacitance value by ranging an operating parameter of the reader antenna assembly 20, which is correlated to the capacitance of the antenna tuning circuit 30, through a progression of values. The controller 24 correlates the values of the antenna assembly operating parameter to values of an operating parameter of the reader 14, which are determined by the controller 24 while ranging the values of the antenna assembly operating parameter. The controller 24 sets the value of the antenna assembly operating parameter which achieves the preferred capacitance value using the correlation between the antenna assembly operating parameter and reader operating parameter.

In specific terms, the above-recited method is initiated by generating an initial bias instruction signal in the controller 24. The controller 24 outputs the initial bias instruction signal to the variable voltage source 36 which sets an initial tuning bias signal at an initial (preferably nominal) voltage value in response to the initial bias instruction signal. The variable voltage source 36 outputs the initial tuning bias signal to the variable capacitance circuit 34 via the bias signal input terminal 86 and bias voltage receiving circuit 54. The signal driver 38b of the excitation signal generator circuit 38 also outputs an AC drive signal to the reader antenna 32 via the drive signal input terminal 60 and antenna tuning circuit 30, while the controller 24 measures the magnitude of the AC drive signal at the drive signal input terminal 60. It is noted that if the impedances of the reader antenna 32 and signal driver circuit 38b do not match, which is a frequent occurrence, the AC drive signal is undesirably subjected to additive and subtractive reflections.

In the event of an impedance imbalance between the reader antenna 32 and the signal driver circuit 38b, the controller 24 sends additional bias instruction signals to the variable voltage source 36, which direct the variable voltage source 36 to output a series of tuning bias signals in a sequential progression of different voltage values. A preferred progression of voltage values is stepwise between opposite sides of the range of available biasing voltage values. At each different voltage value of the tuning bias signal in the progression, the controller 24 measures or otherwise determines the magnitude of the AC drive signal. The controller 24 plots the resulting values of the magnitude of the AC drive signal versus the voltage values of the tuning bias signals. The controller 24 uses this plot in cooperation with a decision algorithm to select a desired value of the tuning bias signal which corresponds to a point on the plot known to produce a desired impedance match for the reader antenna 32 and signal driver 38b. The controller 24 then sets the voltage value of the tuning bias signal output by the variable voltage source 36 to the desired value.

It is noted that the term "desired impedance match" as used herein encompasses the case where impedance values of the reader antenna 32 and signal driver 38b are essentially identical to one another as well as cases where the impedance values of the reader antenna 32 and signal driver 38b are substantially closer to one another than before the sequential progression of tuning bias signals is performed, thereby enhancing reader performance.

In accordance with alternate embodiments of the above-recited method, one of any number of alternate reader operating parameters can be substituted for the AC drive signal magnitude. Exemplary alternate reader operating parameters include the phase across an inductor in the excitation signal generator circuit 38 or the voltage magnitude on either terminal of the inductor. In any case, the controller 24 determines values of the selected alternate reader operating parameter, plots the resulting values of the alternate parameter versus the voltage values of the tuning bias signals, and proceeds in substantially the same manner as recited above to select a desired value of the tuning bias signal which corresponds to a point on the plot known to produce a desired impedance match for the reader antenna 32 and signal driver 38b.

While the forgoing preferred embodiments of the invention have been described and shown, it is understood that alternatives and modifications, such as those suggested and others, may be made thereto and fall within the scope of the invention.

I claim:
1. A reader for an RFID system comprising:
an antenna assembly including an antenna tuning circuit and an antenna, said antenna tuning circuit coupled to said antenna and said antenna having an antenna impedance, wherein said antenna is operated by an AC signal;
a variable capacitance circuit included in said antenna tuning circuit, said variable capacitance circuit having at least one variable capacitance element that is reversed biased and comprises a DC bias voltage that is smaller in magnitude than said AC signal;

a signal driver coupled to said antenna assembly to apply a drive signal to said antenna, said signal driver having a signal driver impedance; and a controller coupled to said antenna assembly to determine a difference between said antenna impedance and said signal driver impedance and to set said at least one variable capacitance element to a set capacitance value to reduce said difference.

2. A reader for an RFID system comprising:

an antenna assembly including an antenna tuning circuit and an antenna, said antenna tuning circuit coupled to said antenna and said antenna having an antenna impedance;

a variable capacitance circuit included in said antenna tuning circuit, said variable capacitance circuit having a variable capacitance;

a signal driver coupled to said antenna assembly to apply a drive signal to said antenna, said signal driver having a signal driver impedance;

a controller coupled to said antenna assembly to determine a difference between said antenna impedance and said signal driver impedance and to set said variable capacitance to a set capacitance value to reduce said difference; and a variable voltage source coupled between said controller and said variable capacitance circuit to apply a tuning bias signal to said variable capacitance circuit, said tuning bias signal having a biasing voltage value selected to reduce said difference.

3. The reader of claim 1, wherein said antenna tuning circuit further includes a fixed value capacitance circuit having one or more fixed value capacitors coupled in parallel to said antenna.

4. The reader of claim 1, wherein said antenna tuning circuit further includes a fixed value capacitance circuit having one or more fixed value capacitors coupled in series to said antenna.

5. The reader of claim 1, wherein said at least one variable capacitance element comprises a first and second variable capacitance element that are parallely connected.

6. The reader of claim 1, wherein said variable capacitance circuit comprises a fixed value capacitor connected in series to the at least one variable capacitance element.

7. The reader of claim 1 further comprising a radio frequency transmissive housing at least partially enclosing said antenna assembly and a radio frequency reflective baseplate coupled to said housing to reduce susceptibility of said antenna to variations caused by objects in an operating environment of a reader.

8. The reader of claim 7, wherein said housing is fabricated from a plastic.

9. The reader of claim 7, wherein said baseplate is fabricated from a metal.

10. A method comprising:

conveying an AC drive signal from a signal driver to an antenna assembly, wherein said antenna assembly includes an antenna tuning circuit coupled to an antenna, said antenna having an antenna impedance, said signal driver having a signal driver impedance, and said antenna tuning circuit having a variable capacitance element that comprises a DC bias voltage that is substantially smaller than a voltage of said AC drive signal;

determining a difference between said antenna impedance and said signal driver impedance; and setting said variable capacitance element at a set capacitance value to reduce said difference.

11. A method comprising:

conveying a drive signal from a signal driver to an antenna assembly, wherein said antenna assembly includes an antenna tuning circuit coupled to an antenna, said antenna having an antenna impedance, said signal driver having a signal driver impedance, and said antenna tuning circuit having a variable capacitance;

determining a difference between said antenna impedance and said signal driver impedance;

setting said variable capacitance at a set capacitance value to reduce said difference;

generating a tuning bias signal having a biasing voltage value; and applying said tuning bias signal to said antenna tuning circuit to set said variable capacitance at said set capacitance value.

12. The method of 10 further comprising at least partially enclosing said antenna assembly in a radio frequency transmissive housing and coupling a radio frequency reflective baseplate to said housing to reduce susceptibility of said antenna to variations caused by objects in an operating environment of said antenna.

13. A method comprising:

selecting a set capacitance value of an antenna tuning circuit having variable capacitance, wherein said set capacitance value is selected by ranging an antenna operating parameter correlated to said variable capacitance through a progression of antenna operating parameter values; and setting said set capacitance value of said antenna tuning circuit to reduce an imbalance between an impedance of an antenna coupled to said antenna tuning circuit and an impedance of a signal driver applying a drive signal to said antenna.

14. The method of claim 13, wherein said imbalance is due to variations in an operating environment of said antenna.

15. The method of claim 13, wherein said imbalance is due to variations in values of an antenna fabrication parameter of said antenna.

16. The method of claim 13, further comprising determining values of a circuit operating parameter of a circuit coupled to said antenna while ranging said values of said antenna operating parameter.

17. The method of claim 16, further comprising correlating said antenna operating parameter values to said values of said circuit operating parameter.

18. The method of claim 17, further comprising setting said antenna operating parameter to an antenna value correlated to said set capacitance value using a correlation between said antenna operating parameter values and said circuit operating parameter values.

19. The method of claim 13, wherein said antenna operating parameter is a biasing voltage of a tuning bias signal applied to said antenna tuning circuit.

20. The method of claim 16, wherein said circuit operating parameter is a magnitude of a drive signal applied to said antenna.

21. The method of claim 16, wherein said circuit operating parameter is a phase across an inductor in said circuit.

22. The method of claim 16, wherein said circuit operating parameter is a voltage magnitude on a terminal of an inductor in said circuit.

* * * * *